Oct. 24, 1961 D. W. RUBY ET AL 3,005,870
TELEVISION RECEIVER
Filed Oct. 30, 1957
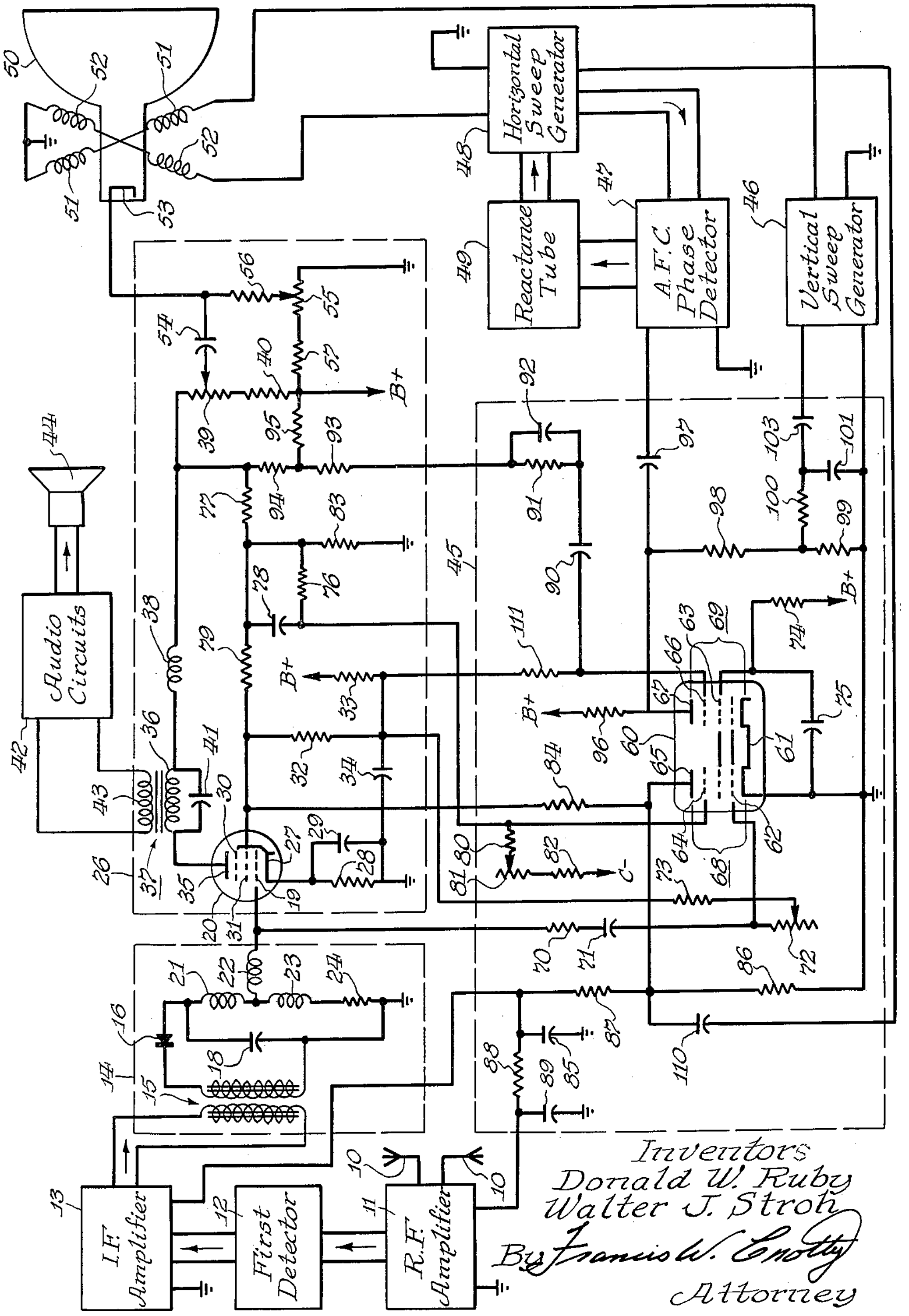
Inventors
Donald W. Ruby
Walter J. Stroh
By Francis W. Crotty
Attorney United States Patent Office 3,005,870

Patented Oct. 24, 1961

3,005,870

TELEVISION RECEIVER

Donald W. Ruby, Maywood, and Walter J. Stroh, Barrington, Ill., assignors to Zenith Radio Corporation, a corporation of Delaware Filed Oct. 30, 1957, Ser. No. 693,364

1 Claim. (Cl. 178—7.3)

This invention relates to a new and improved automatic gain-control system for a television receiver. More particularly, the invention is concerned with a combination of an automatic gain-control and synchronizing-signal separation system for such a receiver.

Impulse noise has long been a source of difficulty in the operation of television receivers, particularly in weak-signal or so-called "fringe" areas. The noise pulses are generally of very short duration but of substantially greater amplitude than the synchronizing signal components of the composite video signal; as a result, the noise may cause black spots or streaks in the reproduced image or may result in false synchronization or loss of synchronization in the scanning circuits of the television receiver. These difficulties have been overcome to a substantial extent in many commercial television receivers by means of a noise-immune synchronizing signal separator comprising a clipping amplifier to which negative-polarity and positive-polarity composite video signals are applied in time coincidence. The negative-polarity signal effectively noise-gates the amplifier to eliminate noise pulses in the output signal of the sync separator, affording substantially stable operation of the line- and field-scanning systems of the receiver. Noise immune sync separators of this kind are described and claimed in the copending application of Robert Adler and Meyer Marks, Serial No. 230,472, filed June 8, 1951, now U.S. Patent No. 2,814,671, issued November 26, 1957, and assigned to the same assignee as the present invention. In addition, a detailed description of the structure and operation of a system of this kind is set forth in an article entitled "An Economical Noise-Immune Sync Clipper" by M. Marks, pages 124–127 of the journal "Electronics" for April 1952.

In a noise-immune sync separator of the kind described, a variable impedance is usually provided in the noise-gating input circuit to permit optimum adjustment of the sync clipper for strong and weak signal operation. When adjusted for maximum noise protection under weak signal conditions, however, the receiver may be falsely synchronized in a split phase condition if switched to a strong signal channel. This false synchronization may be encounted particularly in receivers featuring the conjoint use of a time-gated automatic gain-control system and a noise-gated sync separator in the receiver.

To overcome this difficulty, it has been proposed to utilize a noise-gated automatic gain-control system instead of a time-gated system. Noise gated AGC systems are described, for example, in the copending application of Robert Adler, Serial No. 314,373, filed October 11, 1952, and in the copending application of Robert Adler and John G. Spracklen, Serial No. 568,049, filed February 27, 1956, now U.S. Patent No. 2,915,583 issued Dec. 1, 1959, both of which are assigned to the same assignee as the present invention. Both of these systems effectively avoid false synchronization of the kind noted above. At the same time, however, they may in some instances fail to realize fully the advantages inherent in a time-gated AGC system, namely, gain control which is predicated upon the relatively constant-amplitude synchronizing signal components of the composite video signal and is therefore not substantially affected by the video modulation of the received signal.

The primary object of the invention, therefore, is a new and improved television receiver including an automatic gain-control system which is substantially noise-immune and which effectively minimizes false synchronization of the scanning system of the receiver.

A more specific object of the invention is a new and improved gain-control system for a television receiver which retains to a substantial extent the advantages of previously known time-gated and noise-gated systems.

A further object of the invention is a new and improved time-gated automatic gain-control system which may be effectively combined with a noise-gated synchronizing signal separator.

Another object of the invention is a new and improved gated automatic gain-control system for a television receiver which is not subject to malfunctioning when the receiver is tuned from a weak signal operating condition to a relatively strong signal condition and vice versa.

An additional object of the invention is a new and improved substantially noise-immune gain-control and sync separator system which requires but one relatively simple and economical electron discharge tube.

A corollary object of the invention is a new and improved time-gated AGC system which requires little, if any, adjustment as the receiver is tuned between weak-signal and strong-signal operating conditions.

A television receiver, embodying the invention, comprises a horizontal-frequency scanning signal generator for generating a scanning signal including periodic scanning pulses. There is a detector for developing a negative-polarity composite video signal and there is a video amplifier including screen, output and control electrodes with the control electrode direct current coupled to the video detector to generate a positive polarity composite video signal. A gain control system is provided having a cathode, a noise gate electrode, an additional control electrode and an anode arranged in the recited order. A time gating circuit is coupled to the scanning signal generator and to the gain control system for conditioning that system to conduct in time coincidence with the scanning pulses. Coupling means apply the negative polarity and the positive polarity composite video signals in time coincidence to the noise gate and to the additional control electrode of the gain control system, respectively. Integrating means connect to the gain control anode to develop a gain-control potential representative of the average amplitude of the synchronizing signal components of the composite video signal. A bleeder network including a source of positive potential and a screen dropping resistor connects to the screen electrode of the video amplifier and has such a low value of bleeder current that potential variations of the screen dropping resistor are determined primarily by the flow of screen current in the video amplifier. A biasing circuit, including a low-pass filter interconnecting the screen dropping resistor and the noise gate electrode, applies to the noise gate electrode a positive biasing potential which changes in variation with the average amplitude of the positive-polarity composite video signal.

The features of the present invention which are believed to be novel are set forth with particularity in the appended claim. The organization and manner of operation of the invention, together with further objects and advantages thereof, may best be understood by reference to the following description taken in connection with the accompanying drawing which is a schematic diagram of a television receiver including a gain-control and sync separator system constructed in accordance with one embodiment of the invention.

The television receiver illustrated in FIGURE 1 comprises an antenna 10 coupled to a radio frequency amplifier 11 which, in turn, is coupled to a heterodyning stage or first detector 12. First detector 12 is coupled to an intermediate-frequency amplifier 13 which may include any desired number of stages. The IF amplifier is coupled to a second detector stage, enclosed within the dash outline 14, by means of a conventional transformer 15. The second detector circuit comprises a diode 16 having its cathode connected to one terminal of the secondary winding of transformer 15; the other terminal of the transformer secondary is grounded. The anode of diode 16 is by-passed to ground for intermediate-frequency components by means of a capacitor 18; the anode of the diode is also coupled to the control electrode 19 of an amplifier tube 20 by means of a peaking coil 21 and a coupling coil 22. Control electrode 19 of the amplifier is returned to ground through a circuit comprising a coil 23 connected in series with a resistor 24.

Tube 20 constitutes the amplifier tube of a video amplifier circuit 26 of generally conventional construction. The cathode 27 of the amplifier tube is connected to ground through a biasing circuit comprising a resistor 28 and a shunt capacitor 29. The suppressor electrode 30 and cathode 27 of the amplifier tube are connected to each other. The screen electrode 31 is connected to a source of positive unidirectional operating potential B+ through a pair of series connected resistors 32 and 33, the resistor 33 being by-passed to ground by a capacitor 34. The anode 35 of tube 20 is connected to D.C. source B+ through a series circuit comprising the primary winding 36 of a transformer 37, a peaking coil 38, a contrast control potentiometer 39, and a load resistor 40. A capacitor 41 is connected across transformer primary 36 to form a parallel-resonant circuit which is tuned to a frequency corresponding to the difference between the video-signal carrier frequency and the sound-signal carrier frequency to derive intercarrier sound signals which are applied to the audio circuits 42 of the television receiver through the secondary 43 of transformer 37. Audio circuits 42 may include a suitable audio detector and an audio amplifier of any number of stages coupled to a suitable loudspeaker 44.

The television receiver illustrated in the drawing further includes a gain control and synchronizing signal separation system 45 which is coupled to both second detector 14 and video amplifier 26. The AGC potentials developed in system 45 are supplied to radio-frequency amplifier 11 and to IF amplifier 13. Additional output circuits from system 45 are coupled to a vertical-frequency sweep generator 46 and to an automatic-frequency-control phase detector 47. The phase detector is also coupled to the output of a horizontal-frequency sweep generator 48 and the output of the phase detector is applied to a reactance tube circuit 49 which in turn is coupled to sweep generator 48. The two sweep generators 46 and 48 are coupled to the deflection system of an image reproducer 50, the deflection system being represented schematically by the deflection coils 51 and 52. The cathode 53 of picture tube 50 is coupled to contrast control potentiometer 39 through a coupling capacitor 54. The cathode 53 is also connected to a brightness control potentiometer 55 through a resistor 56, the brightness control potentiometer being connected in series with an additional resistor 57 between B+ and ground. For convenience, the remaining elements of the electron gun of picture tube 50 have been omitted from the drawing.

As thus far described, the television receiver illustrated in the drawing is entirely conventional; accordingly, only a very brief description of its operational characteristics is presented here. A transmitted signal intercepted at antenna 10 is amplified in RF amplifier 11 and applied to first detector 12, wherein the signal is heterodyned to a suitable intermediate frequency. The IF signal is amplified in circuit 13 and applied to second detector 14 through the input transformer 15. Second detector 14 develops a negative-polarity composite video signal which is utilized to control the operation of amplifier tube 20 in the video amplifier 26. The amplified composite video signal appearing at the anode 35 of tube, 20, which is of course inverted in phase with respect to the input signal from detector 14, is applied to cathode 53 of the picture tube to intensity-modulate the electron beam of the image reproducer in the usual manner. The intercarrier sound signals developed in the tuned circuit 36, 41 are supplied to the audio system and are utilized to reproduce the sound portion of the television broadcast. The synchronizing signal components of the composite video signal are separated in system 45 and are applied to the sweep signal generating circuits 46–49 of the receiver to control the phase and frequency of the scanning signals generated therein; these scanning signals are in turn supplied to the deflection yoke comprising coils 51 and 52 to control deflection of the electron beam across the image screen of picture tube 50. Circuit 45 also generates AGC potentials which are applied to amplifiers 11 and 13 to control the amplitude level of the IF signal supplied to detector 14.

The AGC and sync separator system 45 of the invention comprises an electron discharge device 60, preferably constructed as a semi-divided pentode of the type commercially available under the designation 6BU8. Tube 60 includes a cathode 61, a first control electrode 62, a screen electrode 63, a pair of individual additional control electrodes 64 and 66, and a pair of anode or output electrodes 65 and 67. The anodes 65 and 67 are individually associated with control electrodes 64 and 66 respectively. Tube 60 thus comprises two distinct and distinguishable electron discharge systems; these are a gain-control discharge system 68 including electrodes 61–65 and a synchronizing-signal separation discharge system 69 comprising electrodes 61–63, 66 and 67. The cathode, first control and screen electrodes are common to the two systems.

First control electrode 62, which is common to the two discharge systems 68 and 69, is coupled to second detector 14 by means of a series RC circuit comprising a resistor 70 and a coupling capacitor 71. The first control electrode is also connected to a biasing circuit, comprising a potentiometer 72 and a bias resistor 73, which is returned to D.C. source B+ by being connected to the common terminal of resistors 32 and 33. Cathode 61 is grounded and screen electrode 63 is connected to source B+ through a resistor 74. The screen electrode is also by-passed to ground through a capacitor 75.

The additional control electrode 64 of gain-control discharge system 68 is coupled to the output circuit of video amplifier 26 by means of a D.C. coupling circuit comprising two resistors 76 and 77 connected in series with each other between control electrode 64 and one terminal of contrast control potentiometer 39; the common terminal of resistors 76 and 77 is returned to ground through a resistor 83. Control electrode 64 is also connected to the video amplifier by an A.C. coupling circuit comprising a capacitor 78 and a resistor 79 connected in series with each other and returned to the screen electrode 31 of amplifier tube 20. Control electrode 64 is further connected to a biasing circuit comprising, in series, a resistor 80, a potentiometer 81, and an additional biasing resistor 82 which is returned to a source of negative unidirectional operating potential C−.

Anode 65 of the gain control discharge system is connected to the screen electrode of amplifier tube 20, through a biasing resistor 84. The energizing circuit for the anode further includes a resistor 86 which is returned to ground, the resistors 84 and 86 constituting a voltage divider which determines to some extent the operating potential for anode 65. The anode potential resulting from this circuit alone is of such low level that there is no current flow to anode 65. Pulsed excitation potential is also provided for anode 65 through an A.C. coupling circuit comprising a capacitor 110 which couples the anode to horizontal sweep generator 48. In net effect, the anode-cathode potential supports current flow to anode 65 during synchronizing-component intervals of the received signal in customary time-gate action. Anode 65 is further connected to RF amplifier 11 by means of an integrating circuit including a pair of series connected resistors 87 and 88 and a pair of capacitors 85 and 89 which are returned to ground. A similar output circuit connects anode 65 to IF amplifier 13.

The control electrode 66 of sync separation discharge system 69 is coupled to the output circuit of video amplifier tube 20 by means of an A.C. coupling circuit comprising a coupling capacitor 90 connected in series with a parallel RC circuit including a resistor 91 and a capacitor 92, the other end of the RC circuit being connected to a voltage divider comprising a pair of resistors 93 and 94 connected in series with each other between the RC circuit and one terminal of contrast control potentiometer 39. The common terminal of resistors 93 and 94 is returned to B+ through a resistor 95. Control electrode 66 is also provided with a suitable operating potential by connection through a resistor 111 to screen-dropping resistor 33 of the video amplifier circuit. Anode 67 of the sync separation discharge system is connected to D.C. source B+ by means of a resistor 96 and is coupled to the AFC phase detector 47 by means of a coupling capacitor 97. Anode 67 is also returned to ground through a load circuit comprising a pair of series connected resistors 98 and 99. An additional output circuit for the synchronizing discharge system comprises a resistor 100 connected to the common terminal of the two load resistors 98 and 99 and coupled to vertical sweep generator 46 through a coupling capacitor 103. The coupling resistor 100 is also returned to ground through a capacitor 101, resistor 100 and capacitor 101 affording an integrating circuit in the input to sweep generator 46 to accomplish intersync separation in the usual fashion.

In operation, the circuit 45 is in many respects similar to the noise-gated AGC and sync separation circuits now in use in the television industry and described in the aforementioned patent application of Robert Adler and Meyer Marks and in the article by M. Marks. More specifically, the AGC and sync separation system 45 follows directly the teaching of the above noted copending application of Robert Adler and John G. Spracklen, Serial No. 568,049. Negative-polarity composite video signals are applied to first control electrode 62 from second detector 14 of the receiver; the positive bias potential on control grid 62 is established at a level such that the electron stream in tube 60 is cut off in the presence of high amplitude noise impulses but not by the synchronizing signal components of the received composite video signal. Consequently, both sections of tube 60 are cut off by high amplitude noise contained in the received signal.

Both the A.C. and D.C. components of the positive-polarity composite video signal appearing at anode 35 of the video amplifier tube are supplied to electrode 64 of AGC discharge system 68 in time coincidence with the negative-polarity signal applied to control electrode 62. Control electrode 64 is biased negatively with respect to cathode 61 by the biasing circuit comprising resistors 80 and 82 and potentiometer 81, which returns control electrode 64 to the negative D.C. source C—. As pointed out above, the operating potential applied to anode 65 of AGC discharge system 68 by the energizing circuit including resistor 84 is not sufficient to render the discharge system conductive. Rather, this portion of tube 60 is rendered conductive only throughout the duration of positive pulses applied to anode 65 from sweep generator 48 through the time-gating circuit comprising capacitor 110. Consequently, the AGC discharge system operates as a time-gated noise-gated clipping amplifier and under normal operating conditions is conductive only during time intervals coincident with the synchronizing signal portions of the composite video signal. The output signal from anode 65, which comprises pulses having an amplitude level determined by the amplitude of the synchronizing portions of the composite video signal, is integrated to develop a gain-control potential. The potential is applied to RF amplifier 11 and IF amplifier 13 to control the gain of those stages of the receiver in conventional manner. Thus, the amplification level of amplifiers 11 and 13 is adjusted inversely in accordance with received signal strength to maintain the signal level to detector 14 within a relatively narrow range in spite of wide variations of received signal strength.

The A.C. components of the positive polarity composite video signal are applied to second control electrode 66 of sync separation discharge system 69, again in time coincidence with the negative-polarity signal supplied to control electrode 62. The coupling impedances in the input circuit to control electrode 66 are selected to afford a self-bias potential which is slightly negative with respect to cathode 61; consequently, discharge system 69 also operates as a clipping amplifier and develops a synchronizing-control signal comprising pulses representative of the phase and frequency of the sync components of the composite video signal. This synchronizing-control signal is applied to phase detector 47 and to sweep generator 46 in conventional manner to control the phase and frequency of the vertical and horizontal frequency scanning signal circuits of the receiver. Consequently, gain-control and sync separator system 45 operates in substantially the same manner as the system described in the above noted copending application of Robert Adler and John G. Spracklen, Serial No. 568,049, except for the time gating applied to gain control discharge system 68.

Time-gating of the AGC discharge system affords a substantial advantage in operation of the television receiver in that the AGC potential is more effectively immunized from the effects of changes in video modulation level than is possible in systems which depend solely upon adjustment of the clipping level of the AGC amplifier. At the same time, however, use of the time-gating arrangement makes it possible for the receiver to be synchronized in split phase condition under circumstances in which potentiometer 72 is adjusted for weak signal operation and the receiver is switched to a channel which affords a relatively strong signal. This difficulty is obviated in accordance with the present invention, being substantially overcome by the variable bias circuit comprising resistor 73, which couples control electrode 62 of AGC and sync separator tube 60 to the output electrode system (specifically, the screen electrode) of video amplifier tube 20.

In the presence of a relatively strong signal at the output of second detector 14 conduction in amplifier tube 20 is at a low level. As a consequence, screen electrode 31 of the video amplifier tube is maintained at a relatively high average positive potential. Under weak signal conditions, on the other hand, a substantially greater discharge current flows in tube 20, materially reducing the amplitude of the average positive potential on the screen electrode. Consequently, the operating potential of control electrode 62 of tube 60 varies directly with variations in the average amplitude of the positive-polarity composite video signal developed in tube 20, since relatively high-frequency components of the positive-polarity composite video signal are by-passed to ground through the capacitor 34. Accordingly, if the AGC potentiometer 72 has been adjusted for optimum operation in response to a weak received signal and the receiver is switched to tune in a substantially stronger signal, the bias potential on control grid 62 is increased in a positive direction, changing with the screen potential of tube 20 and thus preventing the high-amplitude negative-polarity composite video signal applied to control electrode 62 from interrupting conduction in the AGC discharge system. Consequently, the AGC system is not paralyzed by switching to a somewhat stronger signal, and loss of synchronization does not occur. Both difficulties might otherwise result were the bias potential of electrode 62 not changed to avoid anode current cut off because of the high-amplitude signal present on that electrode in response to receipt of a strong signal.

It would seem that the desired variable potential for control electrode 62 of the AGC and sync separator systems could be achieved by returning the control electrode to the screen or anode of any amplifier in the receiver which exhibits an average voltage determined by the strength of the composite video signal. For example, amplifier stages 11 and 13 are suitable although, being subject to the control of the AGS system, they are not capable of providing as complete performance as that realized through the illustrated arrangement wherein the bias of electrode 62 is derived from the screen electrode of video amplifier 20. This will be more completely understood from a detailed consideration of the effect of the gain control potential on the RF and IF amplifiers.

During the reception of relatively weak signals, the AGC potential tends to increase conductivity of these amplifiers wherefore the bias potential obtained from their screen electrode is appropriate for application to control electrode 62. When the receiver tuning is changed to respond to a signal of relatively greater strength, the AGC system reduces the gain of such amplifiers, increasing the screen potential and changing the bias of control electrode 62 in the proper sense. However, during intervals in which the receiver is being switched from one channel to another, so called interstation operating intervals, the input signal to the receiver is reduced to zero which causes the AGC system to increase the gain of amplifiers 11 and 13 to the maximum. Under such conditions, the screen potential has its lowest value and, were control electrode 62 to derive its bias therefrom, it would of course have a low amount of bias. Then, should the tuning mechanism select a strong incoming signal, the bias condition of control electrode 62 would be inappropriate resulting in paralysis of the AGC system and possible difficulty in the synchronizing separator.

This is to be contrasted with the arrangement shown in the drawing wherein, as the receiver is tuned from a no signal condition to the reception of a strong signal, a correspondingly strong signal of negative polarity is obtained in the output circuit of detector 14 and is applied to the control electrode of video amplifier 20. As a consequence, the screen potential of that tube increases to change the bias of control electrode 62 in the proper direction and amount to avoid paralysis. In this fashion, the described arrangement precludes imperfections in the operation of the AGC and sync separator systems both in response to changes between strong and weak signal conditions and also the effects of the zero signal or interstation operating conditions. Of course, most complete results are realized with the D.C. connection of the first video amplifier 20 to the second detector 14; an A.C. coupling between these components of the receiver reduces the effectiveness of the changes in operating bias of control electrode 62.

With a sync separator and AGC circuit constructed in accordance with the invention, adjustment of AGC potentiometer 72 is reduced to a minimum. In most locations, including those in which the signal strength of various channels may vary over a relatively wide range, it is possible to adjust the potentiometer to afford stable and effective operation at the weakest channel and to leave the potentiometer at this setting without adversely affecting operation on those channels affording a stronger signal. Of course, if the receiver is required to operate at the extreme fringe of the reception area for one channel but is positioned within the strong-signal area of another channel, it may be desirable to make some adjustments in the AGC potentiometer. The AGC system retains virtually all of the advantages of the previously known noise-gated and time-gated arrangements without introducing many of the difficulties and problems presented by either. Moreover, the combined AGC and sync separator system 45 is relatively simple and economical and requires a minimum of components, thereby materially enhancing the competitive position of a receiver in which it is included.

In order to afford a more complete and specific illustration of the invention, suitable impedance values and other circuit parameters for an AGC and sync separator system constructed in accordance with the embodiment of the invention illustrated in the drawing are set forth hereinafter. It should be understood that this material is included solely by way of illustration and in no sense as a limitation on the invention.

| | | |
|---|---|---|
| Tube 20 | | ½ 6UW8A |
| Tube 60 | | 6BU8 |
| B+ | volts | 265 |
| C− | do | −80 |
| Resistor 32 | ohms | 330 |
| Resistor 33 | kilohms | 33 |
| Resistor 70 | do | 68 |
| Resistor 73 | megohms | 1 |
| Resistor 74 | kilohms | 27 |
| Resistor 76 | do | 220 |
| Resistor 77 | do | 100 |
| Resistor 79 | do | 100 |
| Resistor 80 | do | 100 |
| Resistor 82 | do | 180 |
| Resistor 83 | ohms | 6800 |
| Resistor 86 | kilohms | 680 |
| Resistor 111 | megohms | 12 |
| Capacitor 34 | microfarads | 4 |
| Capacitor 71 | do | 0.1 |
| Capacitor 75 | do | 0.4 |
| Capacitor 78 | do | 0.01 |
| Capacitor 110 | do | 0.001 |
| Potentiometer 72 | megohms maximum | 5 |
| Potentiometer 81 | kilohms maximum | 750 |
| Bias voltage electrode 62 | volts | −0.2 to +0.1 |
| Bias voltage electrode 63 | volts | +66 |
| Bias voltage electrode 64 | do | −11 |
| Bias voltage electrode 65 | do | +27 |
| Bias voltage electrode 66 | volts | −20 to −25 |
| Bias voltage electrode 67 | volts | +45 |

While a particular embodiment of the invention has been shown and described, it will be obvious to those skilled in the art that changes and modifications may be made without departing from the invention in its broader aspects, and therefore, the aim in the appended claim is to cover all such changes and modifications as fall within the true spirit and scope of the invention.

We claim:

A television receiver comprising: a horizontal-frequency scanning signal generator for generating a scanning signal including periodic scanning pulses; a detector for developing a negative-polarity composite video signal; a video amplifier including screen, output and control electrodes and having said control electrode D.C. coupled to said detector for generating a positive-polarity composite video signal; a gain-control system including a cathode, a noise gate electrode, an additional control electrode and an anode arranged in the recited order; a time gating circuit coupling said scanning signal generator to said gain-control system for conditioning said system to conduct in time coincidence with said scanning pulses; coupling means for applying said negative-polarity and said positive-polarity composite video signals in time coincidence to said noise gate and additional control electrodes of said gain-control system, respectively; integrating circuit means connected to said gain-control anode for developing a gain-control potential representative of the average amplitude of the synchronizing signal components of the composite video signal; a bleeder network, including a source of positive potential and a screen dropping resistor, connected to said screen electrode of said video amplifier and having such a low value of bleeder current that potential variations of said screen dropping resistor are determined primarily by the flow of screen current in said video amplifier; and a biasing circuit including a low-pass filter interconnecting said screen dropping resistor and said noise gate electrode of said gain-control system for applying to said noise gate electrode a positive biasing potential which changes with variations in average amplitude of said positive-polarity composite video signal.

References Cited in the file of this patent

UNITED STATES PATENTS

| | | |
|---|---|---|
| 2,810,783 | Gruen | Oct. 22, 1957 |
| 2,814,671 | Adler | Nov. 26, 1957 |
| 2,846,501 | Janssen | Aug. 5, 1958 |
| 2,868,873 | Splitt | Jan. 13, 1959 |
| 2,885,473 | Kraft | May 5, 1959 |
| 2,915,583 | Adler | Dec. 1, 1959 |
| 2,921,130 | Jones | Jan. 12, 1960 |